(12) United States Patent
Stanford et al.

(10) Patent No.: US 6,421,432 B1
(45) Date of Patent: *Jul. 16, 2002

(54) METHOD AND APPARATUS FOR CONTROLLING A COMPUTER TO IMPLEMENT TELEPHONE FUNCTIONS WITH A DISPLAYED TELEPHONE OF VARIABLE SIZE

(75) Inventors: Michael D. Stanford; Ronald Scott Langham, both of Dallas, TX (US)

(73) Assignee: Picazo Communications, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/497,970

(22) Filed: Feb. 4, 2000

Related U.S. Application Data

(63) Continuation of application No. 09/182,828, filed on Oct. 29, 1998.

(51) Int. Cl.[7] ................................................. H04B 1/00
(52) U.S. Cl. ................................. 379/110.01; 379/93.17
(58) Field of Search ........................ 379/110.01, 93.17, 379/93.19, 93.25, 355; 345/349, 345, 334, 354, 970, 788, 798, 799, 800, 801; 348/14.01

(56) References Cited

U.S. PATENT DOCUMENTS 6,222,520 B1 * 4/2001 Gerszberg et al. .......... 345/113

* cited by examiner

Primary Examiner—Curtis Kuntz
Assistant Examiner—Melur Ramakrishnaiah
(74) Attorney, Agent, or Firm—Pillsbury Winthrop LLP

(57) ABSTRACT

A method and apparatus for controlling a computer to display a multifunction telephone to augment or supplant a regular desktop telephone, said displayed phone having a variable size which may be increased from a minimum size in increments or with a fixed width or length with the other of the two dimensions infinitely variable to a maximum length or width. Each increment displays different virtual buttons which may be virtually pushed using a keyboard or pointing device to carry out various telephone functions such as speed dialing, transfer, speakerphone etc. using the TAPI Windows interface and library of telephone functions or an analogous library and API in other operating systems. As the size of the phone is varied, more virtual buttons become visible and their functions may be invoked. Preferably, the virtual buttons are positioned on the phone display such that they become visible in the order of frequency of use for the typical user.

6 Claims, 7 Drawing Sheets

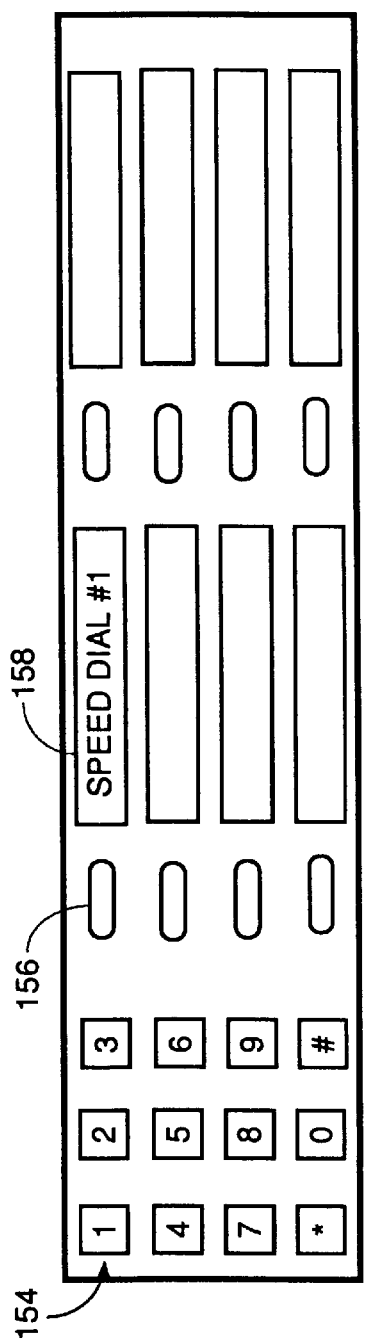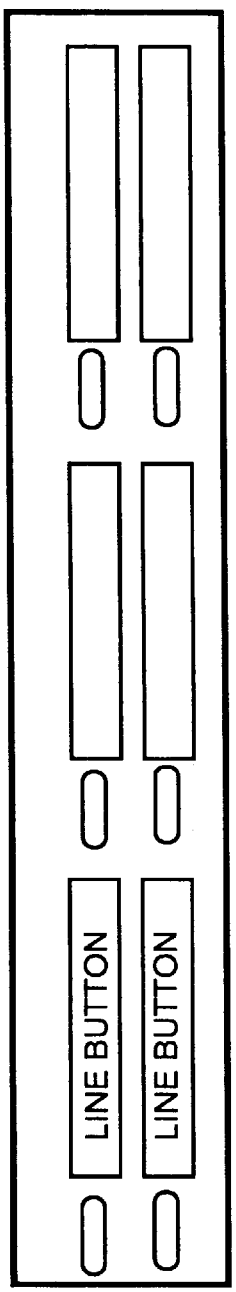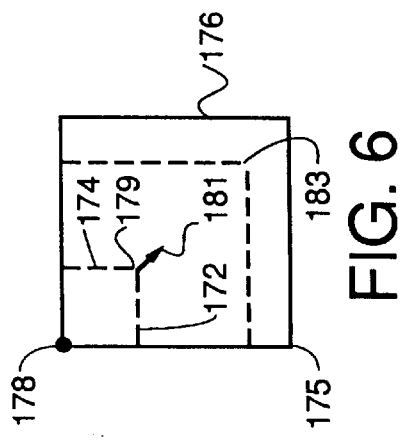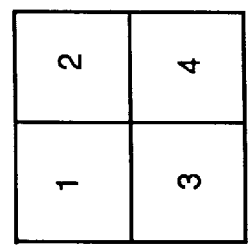
FIG. 3E
FIG. 3F
FIG. 6
FIG. 5
FIG. 4

SIZE INCREASE IN INCREMENT

SIZE DECREASE IN INCREMENT

VIRTUAL BUTTON
PAINT PROCESS

METHOD AND APPARATUS FOR CONTROLLING A COMPUTER TO IMPLEMENT TELEPHONE FUNCTIONS WITH A DISPLAYED TELEPHONE OF VARIABLE SIZE

This is a continuation of a prior U.S. patent application Ser. No. 09/182,828, entitled METHOD AND APPARATUS FOR CONTROLLING A COMPUTER TO IMPLEMENT TELEPHONE FUNCTIONS WITH A DISPLAYED TELEPHONE OF VARIABLE SIZE, filed Oct. 29, 1998.

FIELD OF USE

The invention pertains to the field of application software that makes use of the TAPI interface and TAPI library of functions in the Windows series of operating systems for personal computers, or similar libraries of functions in other operating systems to implement telephone functions using a TAPI compliant modem or other TAPI compliant telephone line interface hardware.

Application programs for personal computers to implement telephone functions are known. These applications are useful in the modem office environment because they are capable of implementing telephones which have more functionality than the actual telephones on the desks of workers. Such functions as answering machine capability, call recording capability, speed dial, conferencing, playing outgoing messages, transfer to voice mail etc. are features that most office telephones do not have. The particular features which are implemented by the phone vary from one application to another, and the particular features implemented in the telephone application are not critical to this invention.

Unfortunately, the display of a telephone with many features, when displayed on a computer monitor, take up a fairly large portion of the display area of the monitor. This is inconvenient sometimes because the user will usually be working in other applications which are competing with the telephone application for space on the monitor. The windows in which the various applications are running then start to overlap and the window in the foreground (the window of the currently active application program) will obscure the displays of other windows of other applications which are also in execution.

Any window of an application that is not the active application will consume system resources such as memory even though the window is not completely visible by virtue of being obscured wholly or partially by the window of the active application. It is desirable to reduce the amount of screen real estate consumed by a running application that is not currently the focus of the user's attention. Windows 95 has a mechanism for doing this called the minimize function. It is a little box in the upper right corner of the window frame in which an application is running. When the user clicks on the box, the particular application (or window displaying a document being worked on in an application such as a word processor which can work on several documents simultaneously) is reduced to an icon on a task bar on the lower part of the screen. When an application is minimized, it continues to run, but does not show on the desktop until its window is restored, for example by clicking its icon on the task bar. This causes the state of the machine to be restored and the application window to be put into the foreground of all windows currently open.

In some telephone applications, there are some often used features and there are some seldom used features. These features of the phone are typically displayed as virtual buttons which can be virtually pushed by a user by manipulation of a pointing device and clicking on the display of the button. However, some of these functions are not used often such as recording a call or changing a voicemail greeting while other functions are used frequently such as dialing from a number in an address book, dialing from the keypad etc. It is useful therefore to be able to display the phone display in segments with the most often used features in the smallest displayable segment and with other features in other segments that can be added sequentially until the button for the desired feature is displayed. This allows screen real estate to be conserved until a particular feature is needed without actually putting the application out of execution. Thus, features that need to be active at all times the computer is on, such as monitoring the phone line for an incoming call, can be maintained in an active state even though the amount of screen real estate consumed by the telephone application can be altered.

As far as the applicants are aware, there is no application of any sort and no telephone applications in particular which allow a user to reduce the amount of screen real estate consumed by the application in increments and which allow a user to select a display size in increments so as to expose virtual function buttons only when they are needed. Exposing functional links to other web pages by varying the size of the Netscape Navigator web browser window in Windows 95 is known, as is scrolling through a web page with a fixed size window until a desired link or virtual function button is displayed so that it can be invoked is known. However, these mechanisms are continuously variable and size changes are not implemented in increments, one new increment or one less increment for each virtual press of a virtual size change button. Therefore a need has arisen for a telephone emulation application program that can run in a window on the display of a computer and which can have the size of the window it runs in changed in increments to expose more or fewer virtual function buttons and so as to reduce the amount of screen real estate consumed by the window without taking the application completely out of execution.

SUMMARY OF THE INVENTION

The genus of the invention is defined as the class of computer programs controlling computers to emulate telephones, all species in the genus having the shared characteristic that the amount of screen real estate consumed by the telephone application can be reduced by reducing the size of the window in which the display created by the telephone application runs without taking the telephone application out of execution altogether, said size reduction being preferably in increments but, alternatively, being selectable between only two sizes. In the preferred embodiment, the telephone application displays a telephone in a window the size of which can be changed in increments down to a minimum size increment. In addition, the phone window can also be minimized in the conventional Windows 95 way. The minimum size increment includes a display area in which names of people to dial from an associated address book can be selected from a drop down menu, and an area in which the number to be dialed can be typed from the keyboard is displayed or the number of the person selected from the address book appears, each additional increment displaying additional telephone functions which can be invoked, the manner in which the telephone functions are displayed, identified and invoked being not critical to the invention. In other species within the genus, multiple increments are available, all with the same width and each increment displays different virtual buttons which can be virtually pushed by a user using a point and click pointing device or keyboard commands to cause the phone application to carry out a telephone function. In another alternative species, each increment of the telephone display can be a different part of the overall phone display in a checkerboard or mosaic fashion. In another alternative species, each increment of the phone display includes different functions with the functions on each incremented ordered according to the frequency of use such that the minimum size function contains the most frequently used functions, the next increment displays the next most frequently used functions and so on until all functions are available for invocation when all increments are being displayed. In still another species, the window in which the phone is displayed is of fixed width, but the length of the window is infinitely variable down or up to the full height by dragging the bottom of the window down to its full extent or up to its full extent starting from either a title bar only or from a minimum size segment. In still another species, the window in which the phone is displayed is of fixed length, but the width of the window is infinitely variable horizontally on the display out to the full width by clicking and dragging the left or right edge of the window displaying a portion of the virtual phone to its desired size starting from a minimum size segment.

BRIEF DESCRIPTION OF THE DRAWINGS

FIGS. 3A through 3F are drawings of the various segments in the preferred embodiment of a virtual phone mosaic displayed in a main window on a computer to emulate a telephone and/or augment the features available on a desktop phone using a computer coupled to a TAPI device and having an operating system having a TAPI library.

FIGS. 4 and 5 illustrate other types of mosaics for display of segments of a virtual phone display may be used in other species where the numbers in the segments indicate the order in which the segments are added each time a virtual size increase button is virtually pushed.

FIG. 6 illustrates a species for a resizable main window for a virtual phone which jumps in segments each of which has an increased width and increased length over the next smaller segment.

DETAILED DESCRIPTION OF THE PREFERRED AND ALTERNATIVE EMBODIMENTS

Figure 1:
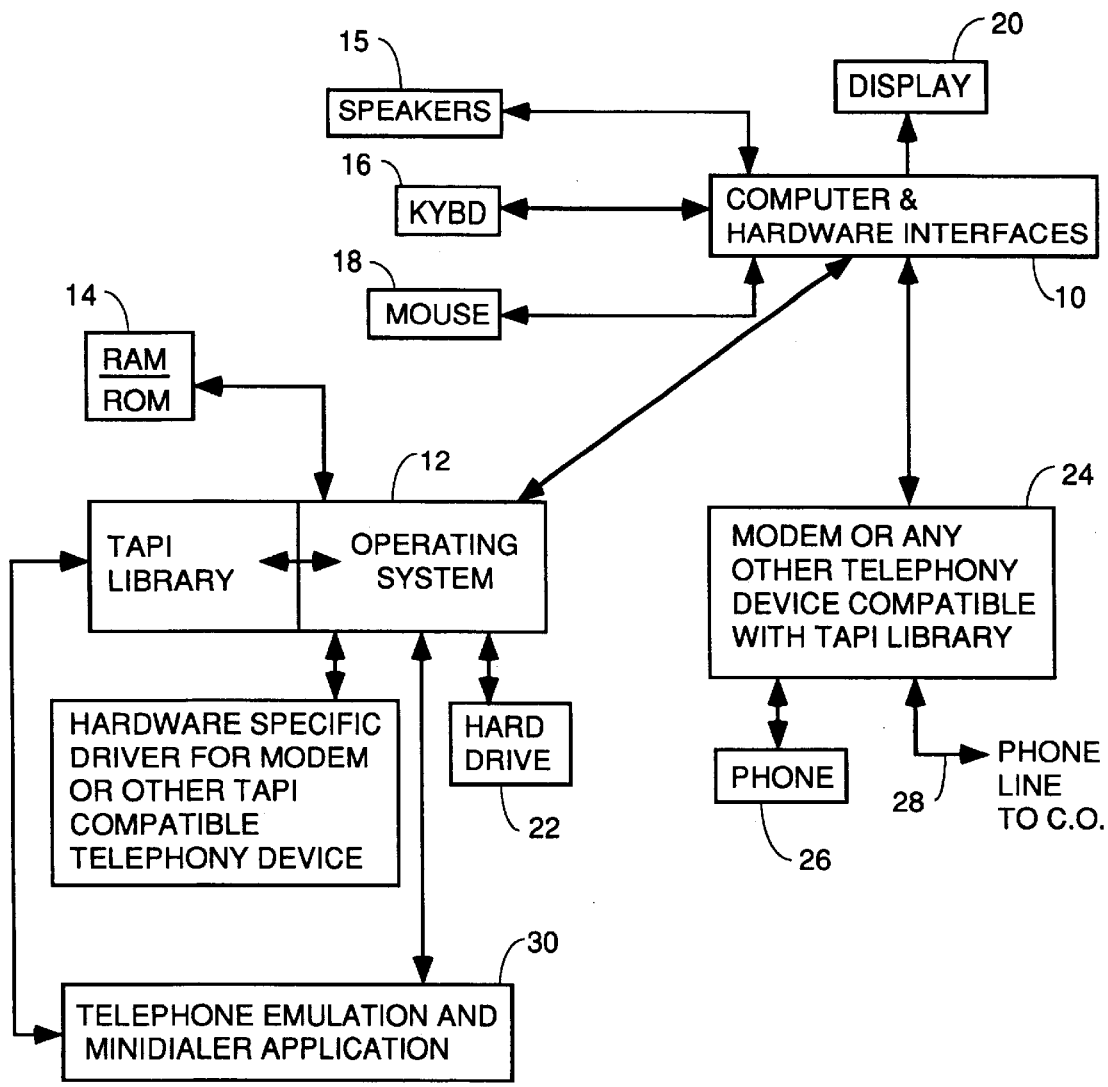
FIG. 1 is a block diagram of one embodiment of a hardware platform and software architecture for a system according to the teachings of the invention.

Referring to FIG. 1, there is shown a block diagram of one architecture for a system for controlling features of an associated telephone system using a personal computer so as to add such features as: speed dialing, speakerphone, redial, mute, multiple line control, call park, call transfer, conference calling, dropping a party from a conference call, and call forwarding. In addition to controlling these features of an associated telephone system, the system of FIG. 1 may include features not directly supported by the associated telephone system such as: dialing from an address book or from a computer keyboard by typing a name or number, multiple appearances for the telephone display on the video display of a computer including display of the telephone display in a resizable box in increments, call logging and popping a record up on a computer display from a contact manager or other program based on caller ID information.

The system of FIG. 1 includes a hardware platform, usually in the form of a Windows based personal computer 10 with any necessary hardware interface circuits for a connection to a telephone system such as a modem, display, keyboard, pointing device, hard disk, and speakers. This computer is controlled by a collection of software programs that define a software architecture that carries out telephone functions in a telephone augmentation or telephone implementation system with a resizable display of a phone according to the teachings of the invention.

The components shown in FIG. 1 comprise a personal computer 10 programmed with several software components including the phone augmentation or implementation application program 30 that implements the unique screen sizing function that is shared by all species of the genus. At the heart of the personal computer is operating system 12 which controls the computer to cooperate with the other system assets such as RAM and ROM memory 14, speakers 15, keyboard 16, mouse or other pointing device 18, display 20 and hard drive nonvolatile rotating memory 22. The personal computer also includes other conventional components that are not shown but which those skilled in the art appreciate must be present such as a clock, power supply, display interface driver software and display interface circuit and other hardware interfaces and software drivers necessary to implement the configuration shown.

To implement a telephone function on the computer, a modem 24 or any other telephony device is necessary either functioning alone or as an interface with a conventional desktop or other telephone 26 and a telephone line 28 from the central switching office. The modem or other telephony device must be capable of carrying out commands issued by the programs in a library of telephone function programs such as a TAPI library.

The TAPI library is shown at 30 and is a library of computer programs supplied by the manufacturer of the operating system 24 that are capable of controlling the computer 10 and (optionally through an additional library of telephone functions optionally supplied by the manufacturer of the associated telephone system, for example a Telephony Service Provider Interface (SPI) driver) other associated hardware connected thereto to implement telephone functions. These functions are invoked by the telephone emulation and/or augmentation program 30 by making function calls through the TAPI interface application programmatic interface (hereafter application programmatic interfaces will be referred to as APIs) of operating system 12 in response to user commands such as virtual pushes of virtual buttons such as telephone keypad dialing buttons or speed dial buttons displayed on display 20 by application program 30. Microsoft supplies a TAPI library of functions with the Windows 95 operating system.

Figure 2:
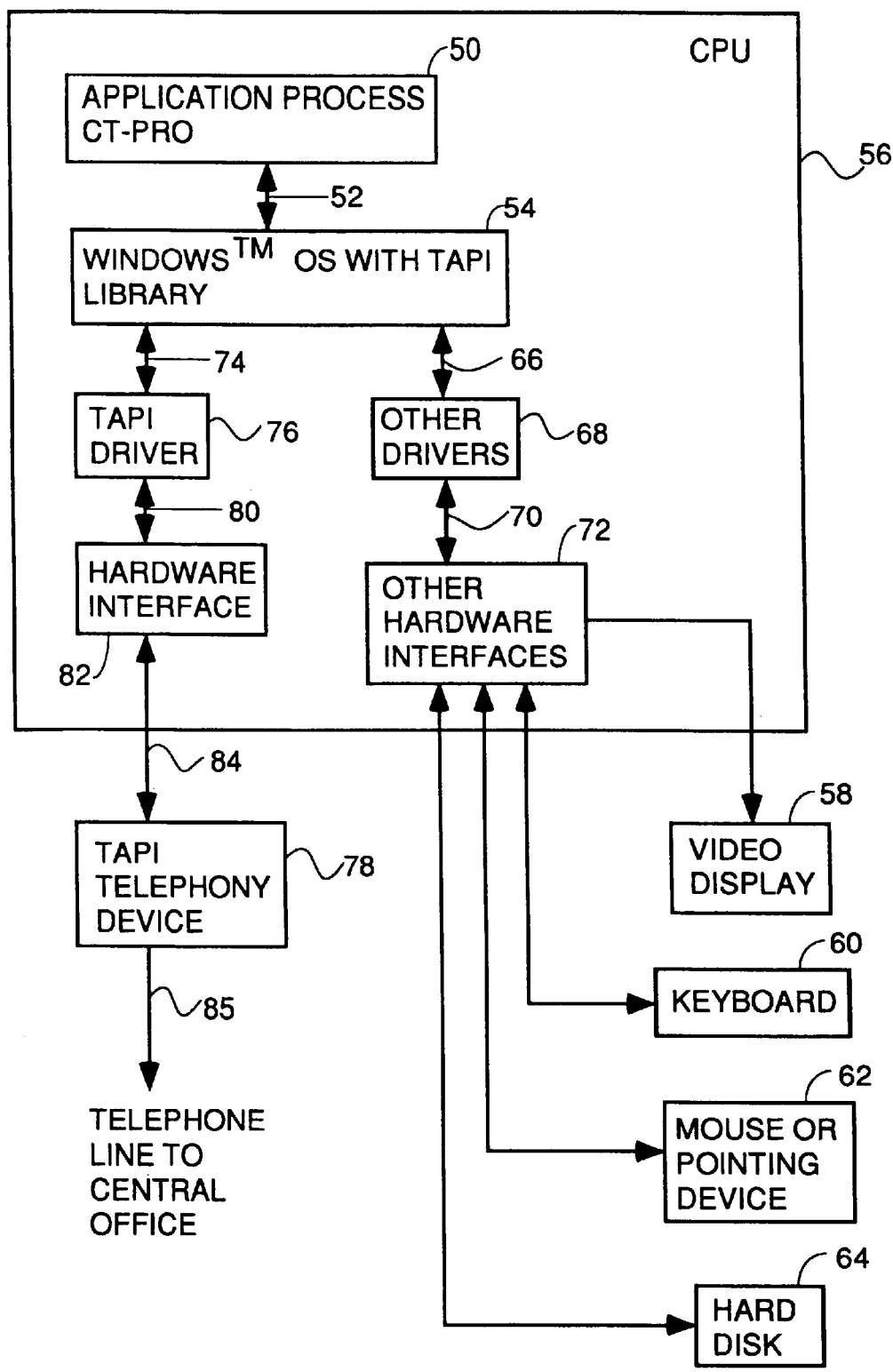
FIG. 2 is a block diagram of the preferred embodiment of a hardware platform and software architecture for a system according to the teachings of the invention.

Referring to FIG. 2, there is shown a block diagram showing the hardware and software architecture of the preferred platform in which the process and apparatus of the invention find utility. An application program 50 communicates through a TAPI interface with the Windows operating system 54 which controls operation of CPU 56. The TAPI interface provides a plurality of defined function calls which may be invoked by application process 50. Each function call and its argument, if any, invokes into execution a program in a TAPI library of programs provided with the Windows OS 54 (or an analogous program in a library of telephone function programs in another OS). That program then controls execution of computer 56 to carry out a specific telephone function associated with the function call.

The CPU is usually a personal computer and has a video display 58, a keyboard 60, a mouse or trackpad or joystick or other pointing device 62 and a nonvolatile bulk storage such as hard disk 64. The operating system 54 communicates via various service provider interfaces 66 with a plurality of drivers for the various hardware devices such as the video display, keyboard etc. The drivers processes 68 communicate via signal paths 70 with other hardware interfaces 72 which function to communicate with the hardware devices such as display 58, keyboard 60, pointing device 62 and hard disk 64 with signals these devices understand.

The operating system 54 also communicates via a service provider interface 74 (hereafter service provider interfaces will be referred to as SPIs) with a TAPI device driver process 76 which is specifically designed to interface a TAPI telephony device 78 with the operating system 54 and the TAPI library programs therein. The TAPI telephony device 78 can be any of a number of devices compatible with the TAPI interface such as a modem, telephone, PBX etc. A TAPI telephony device is an apparatus which connects to a telephone system and controls some aspect of that telephone system, and is in turn controlled by a computer. The computer consists of any electronic apparatus which performs a programmed sequence of instructions. The program causes the computer to communicate with the TAPI telephony device 78 via a library of function calls to a library of computer programs each of which is capable of controlling the TAPI telephony device to implement a telephone function.

When a function call through the TAPI interface invokes a program in the TAPI library into execution, commands and/or data are sent via SPI 74 to the TAPI driver. The driver then converts those commands and/or data into commands and/or data which the specific telephony device 78 understands to carry out that particular function such as pick up the phone line and dial a specific number etc. Data and commands from the TAPI driver process 76 are sent via bus 80 to a hardware interface circuit 82 which converts them into signals on bus 84 which cause telephony device 78 to carry out the desired telephone function. The hardware interface circuit could be an expansion card circuit, a network interface, a serial port, a parallel port, an infrared link etc.—whatever the telephony device 78 requires.

As an example of how the various functional blocks cooperate to carry out a telephone function, suppose telephone device 78 is a telephone. An incoming call arrives on telephone line 84 coupled to the central office switch or PBX. The phone 78 generates a ringing status signal on bus 84 which is sensed by the hardware interface 82 by an interrupt or polling process. The hardware interface passes a message on bus 80 to TAPI driver process 76 which passes an interprocess message via SPI 74 to the OS 54. The OS passes an interprocess message to the application 50 via TAPI interface 52 informing application process 50 that the phone is ringing. The application process then passes a message back to OS 54 through the TAPI interface 52 or another API to cause the OS to paint a "Phone Ringing" message or dialog box on video display 58 via appropriate known processes. This message may include caller ID data passed up to application process 50 and queries whether the user wishes to answer the phone. If the user does wish to answer the phone, a keyboard or point and click command is issued via the pointing device to answer the phone. This message is passed up through hardware interface 72, driver 68, SPI 66 and OS 54 to application process 50. The application process then issues a command via a TAPI function call to invoke a program to control the telephony device 78 to go off-hook. This program runs and generate appropriate function calls via SPI 74 to the TAPI driver process which sends appropriate commands via bus 80 to the hardware interface 82. The hardware interface 82 generates appropriate signals on bus 84 to cause telephone device 78 to go off-hook to answer the phone. If the telephony device 78 is a speakerphone, the user then hears the caller's voice through the speakerphone. If the telephony device is only a modem, the incoming voice would be digitized in the modem 78 or hardware interface and the data routed up through the TAPI driver 76, OS 54, application 50 and back down through the OS and a driver 68 and hardware interface 72 for a set of speakers (not shown) connected to the computer 56 or internal thereto.

Figure 3A:
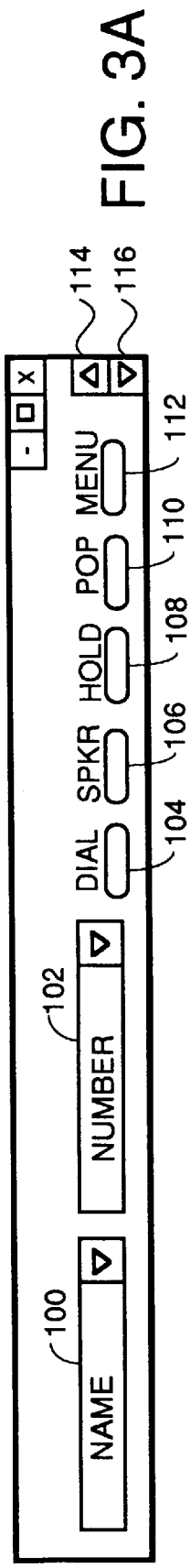

Referring to FIGS. 3A through 3F, there are shown drawings of the six fixed width segments of the preferred embodiment phone display that when, placed adjacent to each other, comprise a mosaic which defines the entire display of a multiline, multiple capability virtual phone. FIG. 3A is the segment which is displayed when the smallest number of segments possible is displayed. This segment has a name box 100 in which a user can type the name of a person to be called. If the name is stored in the phone book, the number will be looked up and added to box 102. If not, the user must type a phone number into box 102. When the user points to and clicks on (a virtual push) virtual Dial button display 104, the TAPI device will go off-hook and dial the number in box 102. Virtually pressing the dial button also displays a list of names and numbers recently called and the pointing device can be used to click on the desired name and dial that person.v If an incoming call with caller ID arrives, the caller ID name and phone number will appear in boxes 100 and 102 and will be stored in the address book. A call log keeps a record of the name, number, time and date and duration of every outgoing and incoming call and allows up to ten pages of notes to be kept for every call. These notes automatically pop up whenever a person in the call log calls in. The call log can be displayed by virtually pressing the Menu button 112 and selecting the Tools and Call Log options.

A Spkr virtual button 106 can be virtually pushed to cause the TAPI device to go off-hook. A virtual Hold button 108 can be virtually pushed to put a call on hold. A virtual Pop button 110 launches a contacts manager application and will look up the record therein of any incoming caller with caller ID. A virtual menu button 112 opens a menu of other options for working with the address book etc. The segment of FIG. 3A also displays the virtual size change buttons. Each virtual push of size reduction virtual button 114 causing one less segment of the mosaic to be displayed until the display is down to the segment shown in FIG. 3A. Each virtual push of size increase virtual button 116 causing an additional segment to be displayed until the maximum number of segments have been displayed. After the maximum or minimum number of segments have been displayed, the system does not respond to further pushes of the size increase or decrease buttons.

The virtual buttons displayed in the segment of FIG. 3A are the functions most frequently used by the average user. Although that may be subject to debate regarding who the average user is and what she does with the phone, the genus of the invention is not defined by the exact ordering of the virtual buttons displayed in each segment and any other ordering will suffice to practice various species within the genus.

Figure 3B:
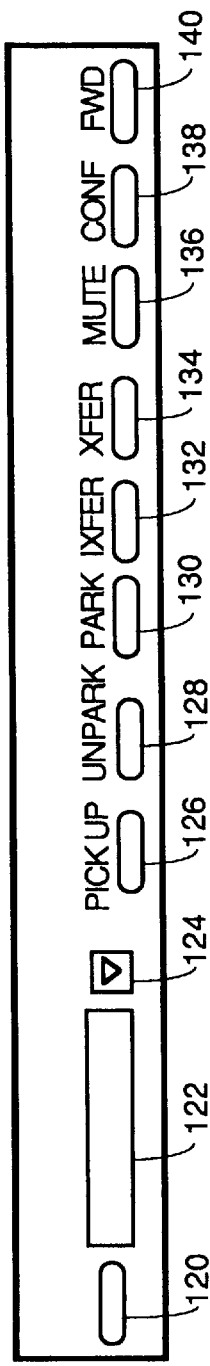

FIG. 3B shows the next segment that is displayed upon detection of a push of the size increase button 116. This segment displays virtual buttons for multiline phones and other less frequently used features. A line button control 120 and display area 122 provide additional functionality over line button controls of standard desktop phones. Before an outgoing call is made, display area 122 displays the telephone number of the line the button 120 serves to select. A virtual push of button 120 selects the line and takes it off-hook. After the line is selected, any number in display area 102 will be dialed when Dial button 104 in FIG. 3A is virtually pushed. When a call is in progress on the selected line, the name of the person called is displayed in display area 122. If a conference call is in progress on the line, the display area 122 displays conference, and a Multiple Calls virtual button 124 may be pushed to expand the display area to display the names of all the people on the call.

A PickUp button 126 may be virtually pushed to pick up a call that is ringing at another station using the displayed virtual phone. When the PickUp button is pushed, a list of numbers recently picked up is displayed and the phone to be picked up can be selected with the pointing device.

A Park button 130 may be virtually pushed to park a call on another extension to add that person to the call whenever his extension becomes free. Virtually pressing the Park button with the pointing device causes display of a list of extensions a call has been most recently parked on such that the extension to park on may be selected with the pointing device or entered via the keyboard by typing the number of the extension to park a call on.

An UnPark button 128 may be virtually pushed to unpark a call from an extension.

An Instant Transfer button 132 allows a call to be instantly transferred to another extension without waiting to determine if the other extension picks up. A Transfer button 134, when virtually pushed, places the call on hold and transfers to another extension such that the transferring party can talk to the person to which the call is to be transferred. Both transfer button display a list of extensions to which calls have recently been transferred when virtually pushed so the extension to transfer to can be selected from the list with the pointing device.

A Mute button 136 allows a microphone picking up outgoing sounds to be cutoff for private conversation.

A Conference button 138 allows one or more additional parties to be added to a call. When virtually pushed, it displays a list of names that have recently been subject to conference calls. The person to add can be selected from the list using the pointing device or the address book can be browsed to pick another name or number.

A Fwd button 140, when virtually pushed, causes all incoming calls to be forwarded to a number specified before virtually pushing the Fwd button by browsing the address book. When the Fwd button is pushed, it displays a list of numbers to which the line has recently been forwarded and provides an option to browse the address book to pick a new number to forward calls to. The pointing device is used to select a number from the list or address book.

Figure 3C:
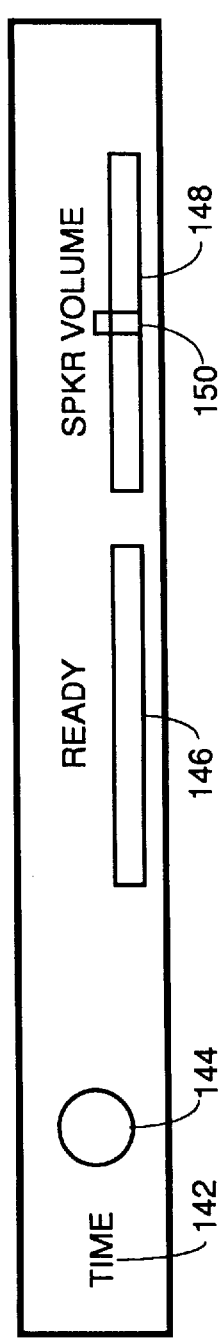

FIG. 3C shows the next segment of the overall phone display mosaic which will be displayed upon detection of another push of the virtual size increase button. Time display 142 and location display 144 will change to show the time at any location called and the city or country location called. Line status display 146 shows whether a line is available or busy. A speaker volume scale 148 and a slider 150 may be virtually slid across the scale 148 to alter the speaker volume.

Figure 3D:
Figure 7:
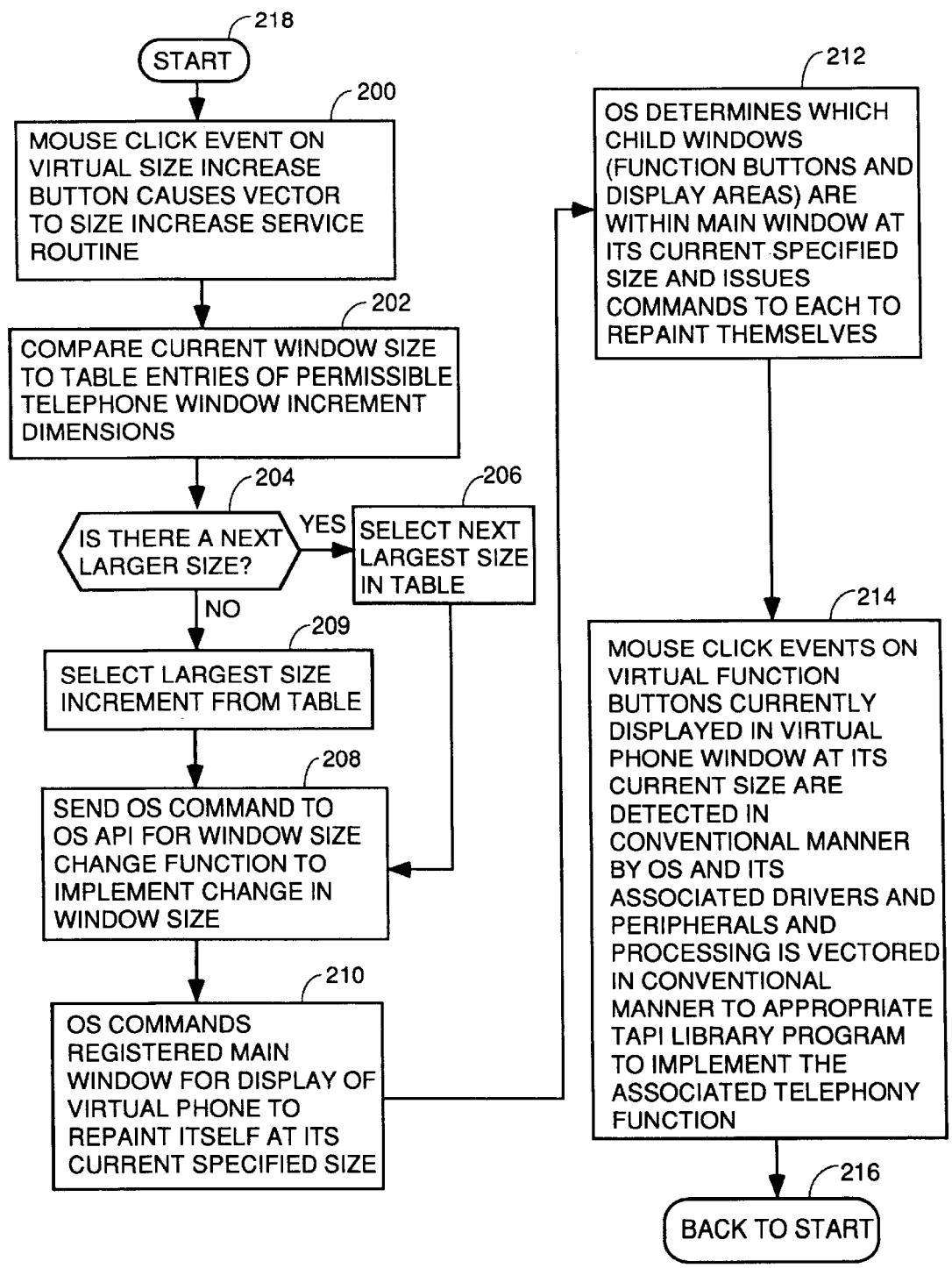
FIG. 7 is a flowchart of a typical process for increasing the size of the display window of the virtual telephone in increments.

FIG. 3D illustrates the next segment that will be displayed with another push of the virtual size increase button. The display area 152 gives a graphical representation of all active calls. The TAPI device driver detected by the operating system will be displayed under the TAPI device column in display area 152. The time, status and telephone number called of every busy line in the system will be displayed in display 152.

FIG. 3E is a diagram of the next segment of the overall phone mosaic that will be displayed in the preferred embodiment in response to detection of another virtual push of the size increase button. This segment has a virtual keypad display 154 which emulates a touchtone keypad where the individual virtual keys may be virtually pushed using the pointing device by clicking on each key to manually dial a number. A plurality of speed dial buttons and display areas, of which speed dial button 156 and display area 158 are typical can each be assigned to any number. Speed dial buttons are programmed by putting the name (and number if the name is not in the address book) of the person to be assigned to the speed dial button in the name box and clicking on the speed dial button to be assigned to that person. The display area next to the speed dial button then displays the name of the person assigned to that speed dial button.

FIG. 3F shows the final segment that completes the entire mosaic of the display of the virtual phone in the preferred embodiment. This segment just displays six line buttons and associated display areas for controlling up to six different telephone lines. Each line button and display area has the behavior described above with regard to line button 120 and display area 122.

FIGS. 4 and 5 illustrate other types of mosaics that could be used for a virtual phone display that increases in size by one segment for each push of a virtual size increase button.

Mosaic is used in this description to refer to the individual pieces of the displayed phone assembled like a jigsaw puzzle FIG. 6 represents another species wherein both a vertical boundary represented by dashed line 172 and a horizontal boundary represented by dashed line 174 exists which define the limits of the currently displayed portion of the phone. Solid box 176 defines the extent of the overall mosaic displaying the entire virtual phone. In this species, the user can change the size of the currently displayed portion of the phone by clicking on a virtual size increase button causes the corner 179 to jump out to a next size increment. For example, one click of a size increase button could cause the corner to jump from the position shown at 179 along the direction of arrow 181 to the position shown at 183 thereby exposing more functional buttons. Each click on a size increase or decrease button causes the computer to repaint the displayed virtual telephone window one increment larger or one increment smaller so as to expose the desired amount of functionality in the form of virtual function buttons.

In the species represented by FIG. 6, as in all the other species described herein, there are virtual buttons and display areas at fixed positions in the mosaic relative to an origin. The origin can be anywhere, but point 178 in FIG. 6 represents one typical origin. Point 178 also represents the most logical place to put the virtual size increase and size decrease buttons also since this location never disappears as the main window size increases or decreases and the location and mapping to service routines of the virtual size increase and decrease buttons do not have to be recalculated when they are placed at origin 178 as they might have to be if they were put in another corner of the main window. Obviously, in other species, the jumps to new sizes can originate from any of the other three corners as well. For example, corner 175 could be the origin and the minimum sized segment could have corner 175 as its orgin with jumps to the next larger segments moving upward and to the right at 45 degrees.

As the size of the currently displayed portion of the overall mosaic is changed by the user in all these species including the species of FIG. 6, more or fewer of these virtual buttons are displayed depending upon whether the size of the portion of the virtual phone being displayed is being increased or decreased. The telephony function associated with a virtual function button cannot be invoked in any of these species if the virtual button assigned to the function is not currently displayed in the visible portion of the mosaic.

Logically speaking, the relationship between the operating system and the displayed portion of the phone and the virtual function buttons is as follows. The positions of each functional button and an origin are fixed. In an operating system wherein the entire window in which the virtual phone is displayed can be moved around the screen, the origin is preferably somewhere in the virtual phone window, so that when the window is moved, the X and Y coordinates of each virtual button and display area relative to the coordinate need not be recalculated. Alternatively, the origin can be some fixed point and whenever the virtual phone window is moved, the coordinates of each function button and display area are recalculated to take into account the displacement of the origin of the virtual phone window from the origin used to define the positions of the virtual function buttons and display areas. Further, the functional mappings between each virtual function button and the TAPI library program which is invoked when the virtual button is virtually pushed are also fixed. The virtual buttons and display areas and the functional mappings can be thought of as a landscape which is fixed and known to the operating system. The virtual phone display can be thought of as a mask with a window in it covering the virtual button landscape. The window can be changed in size by the user in increments with one increment increase for every virtual press of a virtual size increase button and one increment decrease in size for each virtual press of a virtual size decrease button. The only virtual buttons which can be virtually pushed are the ones which can be seen through the window. Any program structure and coding for the operating system 54 and application program 50 which exhibits the above described behavior will suffice to practice the invention as the details of the program architecture, data flow, file structure and coding are not the invention. The invention is any program or set of programs that displays and implements a virtual phone and has the above described behavior regarding size and available functionality changes.

There follows a description of an example of a program structure for an event-driven Windows 95 OS platform which exhibits the above behavior.

Figure 8:
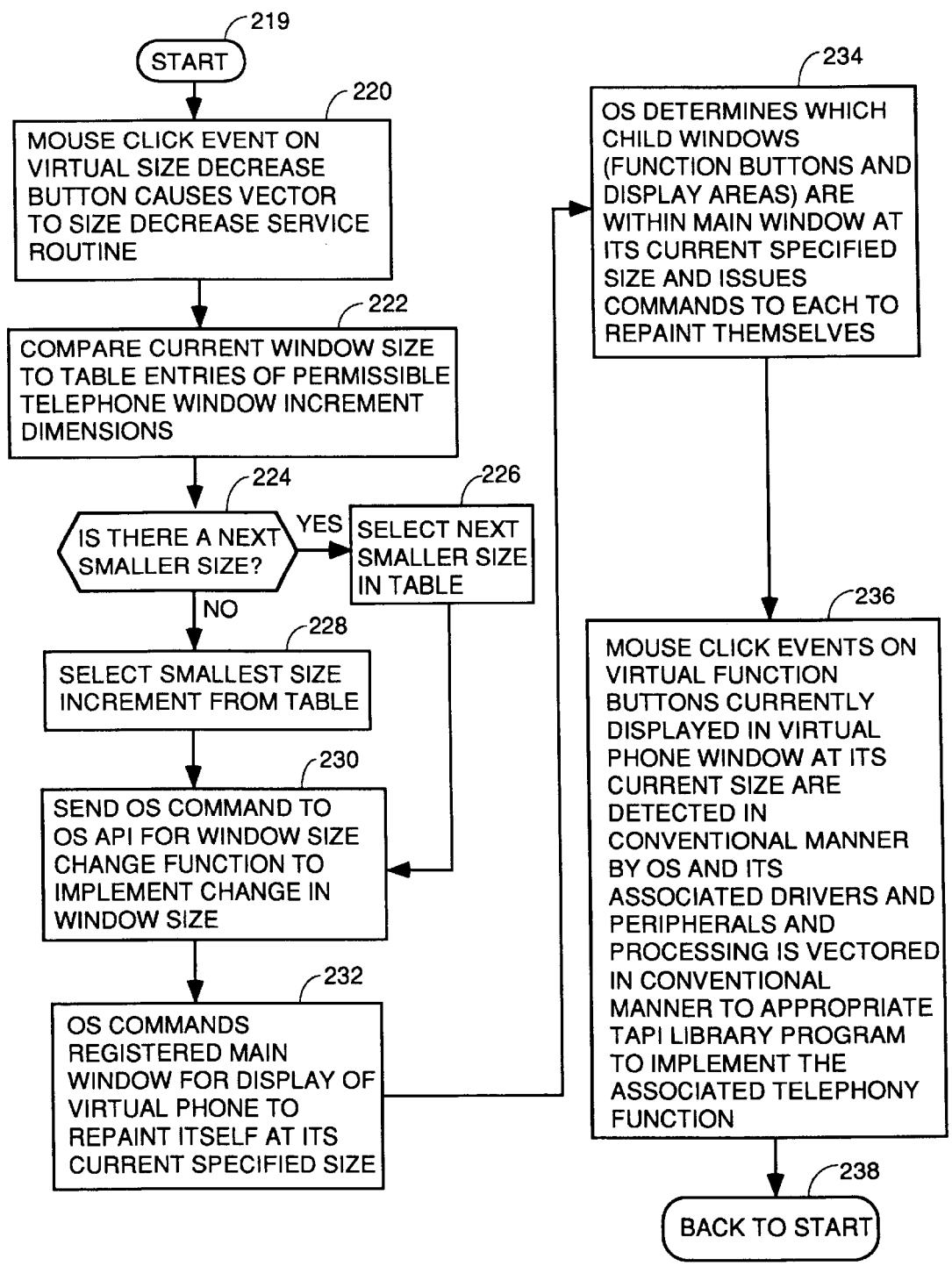
FIG. 8 is a flowchart of the processing in an event driven OS platform for an incremental size decrease.

Referring to FIG. 8, there is shown a flowchart of a typical process for increasing the size of the display window of the virtual telephone in increments. Step 200 represents the process of detecting a mouse click event on the virtual size increase button by conventional means in the operating system and causing processing in the virtual telephone application process 50 in FIG. 1 to vector to a size increase service routine. The size increase service routine compares the current window size of the window in which the virtual telephone is displayed to a table of entries that define permissible telephone window increment dimensions, as symbolized by step 202. This data may be configurable by the user in some species. The purpose of this step is to determine whether there is a larger size virtual telephone window increment available which the user has requested be displayed by virtue of her single click on the virtual size increase button. Test 204 determines if there is a next larger size virtual telephone window increment available. If there is, step 206 selects the next larger size increment for the virtual telephone display window and sets that as the current window size for the virtual telephone display window. Then, in step 208, the application process 50 makes a function call or sends a command to the operating system API for the window size change function requesting a change in size of the main window for the virtual telephone display window to the newly selected size.

Returning to test 204, if it is determined that there is no larger size increment for the virtual telephone display window, step 210 is performed to select the largest size increment virtual telephone display window. After selecting the largest size window for the virtual phone display, step 208 is performed to make a window size change request to the operating system.

In the function call to the OS window size change API, either the size selected in step 206 or the size selected in step 210 is passed to the API as an argument to the function call. Each window of the virtual phone including the main window and each child window for various function buttons or display areas is a piece of code specific to that window which is generated by any one of a number of software development tools. The programmer uses such a tool to define the appearance of the window and after composing the appearance, commands the development tool to compile a section of machine executable code at the detailed level the operating system needs to render the desired window size and appearance on the display 58 in FIG. 1. The section of code for each window controls the computer to paint the window on the display when asked to do so by the OS. Step 210 represents the process of the OS sending a command or function call to the code for the main window for the virtual telephone requesting the code to repaint the main window for the virtual phone. The OS passes the currently selected size for the main window to the main window code. The code for the main window then executes and re-renders the main window at the specified size.

Processing then proceeds to step 212 where the operating system examines the current size of the main window for the virtual telephone and the positions relative to the origin of the main window of all the child windows that define the appearances of virtual buttons and display areas. The purpose of this step is to determine which of these child windows is within the boundaries of the main virtual phone window and must be displayed. Each of these child windows also has a section of code which, when executed, renders the window on the display. The OS then issues commands or function calls to each of the child windows that is within the perimeter of the main window requesting these child windows to repaint themselves. This completes the process of displaying the requested size for the main window of the virtual phone and the windows for the virtual buttons and display areas visible through the main window.

Step 214 represents the conventional process carried out by the operating system, TAPI library and telephone application 50 of detecting mouse clicks on virtual function buttons currently displayed within the perimeter of the virtual phone main window and invoking the associated TAPI library program to carry out the requested function. Step 216 returns to the start of the process at block 218 to wait for another mouse click event on a size increase or size decrease virtual button.

Figure 9:
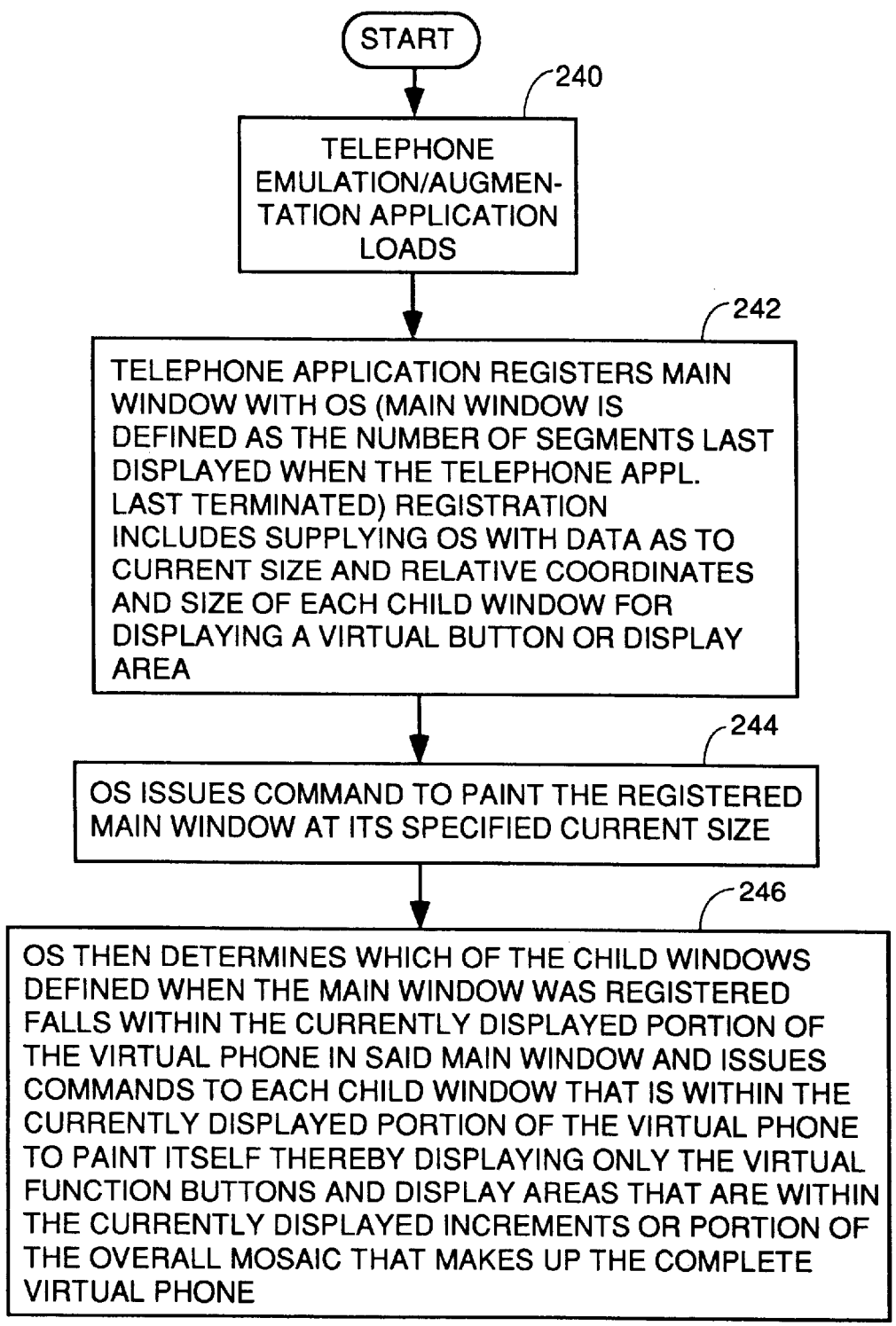
FIG. 9 is a process for registering the main virtual phone window with the OS and painting any virtual buttons which are visible therein upon initial loading of the telephone emulation/augmentation process 50 in FIG. 2.

Referring to FIG. 9 there is shown a flow chart of the processing in an event driven OS platform for an incremental size decrease. Step 220 represents the process of detecting a mouse click on the virtual size decrease button and vectoring processing to a size decrease service routine. Step 222 is the first step performed by the size decrease service routine in comparing the current main window size of the virtual phone to various table entries defining the permissible incremental sizes for the virtual phone main window. Test 224 determines if there is a next smaller incremental main window size. If there is, step 226 represents the process carried out by the size decrease service routine in telephone application process 50 of selecting the next smaller size for the main window displaying the virtual phone from the table entries.

In both the flowcharts of FIG. 8 and FIG. 9, the table entries for permissible window size may be one dimensional or two dimensional. One dimensional means that the main window permissible sizes are all the same fixed width (or the same fixed length) and the increments are defined in terms of incremental window lengths (or incremental window widths). Two dimensional means that each permissible size increment for the main window is defined as a permissible width and a permissible length for the embodiment represented by FIG. 6.

If test 224 determines that there is no next smaller size than the current main window size, step 228 is performed to select the smallest permissible main window size from the table.

After the new window size is selected, either in step 226 or step 228, step 230 is performed to send to the OS a command or make a function call through an OS API for a window size function or library to request a change in size of the main window of the virtual phone. Next, in step 232, the OS sends a command or makes a function call to the API for the main window rendering code section requesting it to repaint the main window of the virtual phone at the new current size determined in step 226 or 228. This code then executes and renders the main window at the new current size. Step 234 then is performed by the OS to determine which of the child windows for the virtual function buttons and display areas are located so as to be within the perimeter of the new main window size. After determining which child windows are within the new perimeter, the OS issues commands or makes function calls to the APIs of each child window requesting it to repaint itself.

Finally, step 236 is performed to perform conventional processing to detect mouse click events on virtual function buttons that are currently displayed within the perimeter of the main virtual phone window. When such a virtual push has been detected, processing is vectored in a conventional manner to the associated library program in the TAPI library by making the appropriate function call through the TAPI to implement the requested telephony function. Step 238 then vectors processing back to start at 218 to wait for the next size change mouse click event.

Referring to FIG. 10, there is shown a process for registering the main virtual phone window with the OS and painting any virtual buttons which are visible therein upon initial loading of the telephone emulation/augmentation process 50 in FIG. 2. The process starts with step 240 where the telephone emulation/augmentation application 50 in FIG. 1 loads into memory after being invoked by a user. In step 242, the telephone application 50 registers a main window in which the virtual phone is to be displayed with the OS. The main window is defined for most embodiments as the size window used for displaying the number of segments of the virtual phone display (or, in the case of linearly changing length or linearly changing width embodiments—the current length or width) last displayed when the telephone application last terminated. In other embodiments, the main window is registered as its total size when all segments are showing along with a current size number which indicates the percentage of the overall window to paint. In still other embodiments, the main window is registered as a series of separate segment windows each of which is one segment of the overall window. All of these different possibilities for registered the main window are deemed by the inventors to be interchangeable and equivalent. It is easier, if appearance of the main window with a border around whatever segments are to be displayed is important, to do the main window as a single window because Windows OS automatically draws borders around windows, and if five separate segment windows were registered, each would have a border drawn around it. However, this may not be important in some embodiments. The registration process also entails supplying the OS with not only with data as to the current size of the main window but also the coordinates relative to an origin and the size of each child window for displaying a virtual button or display area somewhere within a segment of the main window.

In step 244, the OS issues a command to paint the registered main window at its specified current size (or commands the particular windows corresponding to the segments to be displayed to to paint themselves). This causes the main window rendering code to execute and paint a main window of the virtual phone of the size registered with the OS. In step 246, the OS determines which of the child windows defined when the main window was registered falls within the currently displayed portion of the virtual phone main window. Commands are then issued to the code segment responsible for rendering each child window which is visible in the main window to cause each of these code sections to execute and paint the child window which each code section implements using conventional interfaces and processing with the OS. This causes only the virtual function buttons and display areas which are visible within the current main window size to be displayed.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. An apparatus comprising:
    a computer controlled by an operating system program and having a telephone function library of programs that control the computer to implement conventional telephone functions, said operating system controlling said computer to implement a telephone application programmatic interface (TAPI), comprising a plurality of function calls that may be invoked to implement various telephone functions, said operating system being configured to run a telephone application program;

a TAPI compliant telephony device (TAPI device), coupled to said computer by a data path and structured for connection to a telephone line from a telephone service provider, said TAPI device being interfaced with a TAPI compliant driver program, said driver program being capable of receiving general telephone function commands from said programs in said telephone function library and converting them to commands and/or signals specific to said TAPI device and of sending said commands and/or signals to said TAPI device to cause it to carry out telephone functions;

a keyboard coupled to said computer for providing user inputs;

a pointing device coupled to said computer for providing user inputs; and a video display coupled to said computer, wherein said telephone application program controls operations of said computer and a modem via function calls to said TAPI and other application programmatic interfaces to display a virtual telephone on said video display with various displayed virtual keys which may be virtually pushed by a user using said keyboard or pointing device to cause various programs in said telephone function library to execute and cause said TAPI device to carry out the user selected telephone function and to cause said display of said telephone on said video display to have a fixed width but a user selectable length, wherein the user selectable length is selected by placing a pointer, moved by said pointing device, on a bottom or top edge of a window in which said virtual telephone is displayed and dragging said edge to resize the window to a desired length, and wherein the number of virtual keys which are displayed and which are available to be pressed changes with a changing size of the window.

2. The apparatus of claim 1 wherein a first predetermined group of virtual keys are displayed in a smallest segment of the displayed virtual telephone and one or more virtual keys of a second predetermined group of virtual keys are displayed as the size of the displayed virtual telephone increases based at least in part on an approximate order of frequency of use of said virtual keys for an average user.

3. An apparatus comprising:

a computer controlled by an operating system program and having a telephone function library of programs that control the computer to implement conventional telephone functions, said operating system controlling said computer to implement a telephone application programmatic interface (TAPI), comprising a plurality of function calls that may be invoked to implement various telephone functions, said operating system being configured to run a telephone application program;

a TAPI compliant telephony device (TAPI device), coupled to said computer by a data path and structured for connection to a telephone line from a telephone service provider, said TAPI device being interfaced with a TAPI compliant driver program, said driver program being capable of receiving general telephone function commands from said programs in said telephone function library and converting them to commands and/or signals specific to said TAPI device and of sending said commands and/or signals to said TAPI device to cause it to carry out telephone functions;

a keyboard coupled to said computer for providing user inputs;

a pointing device coupled to said computer for providing user inputs; and a video display coupled to said computer, wherein said telephone application program controls operations of said computer and a modem via function calls to said TAPI and other application programmatic interfaces to display a virtual telephone on said video display with various displayed virtual keys which may be virtually pushed by a user using said keyboard or pointing device to cause various programs in said telephone function library to execute and cause said TAPI device to carry out the user selected telephone function and to cause said display of said virtual telephone on said video display to have a fixed length but a continuously variable, user-selectable width, wherein the user selectable width is selected by placing a pointer, moved by said pointing device, on a left or right border of a window in which said virtual telephone is displayed and dragging said border either left or right to resize the window to a desired width, and wherein the number of virtual keys which are displayed and which are available to be pressed changes with a changing size of the window.

4. The apparatus of claim 3 wherein a first predetermined group of virtual keys are displayed in a smallest segment of the displayed virtual telephone and one or more virtual keys of a second predetermined group of virtual keys are displayed as the size of the displayed virtual telephone increases based at least in part on an approximate order of frequency of use of said virtual keys for an average user.

5. An apparatus comprising:

a computer controlled by an operating system program and having a telephone function library of programs that control the computer to implement conventional telephone functions, said operating system controlling said computer to implement a telephone application programmatic interface (TAPI), comprising a plurality of function calls that may be invoked to implement various telephone functions, said operating system being configured to run a telephone application program;

a TAPI compliant telephony device (TAPI device), coupled to said computer by a data path and structured for connection to a telephone line from a telephone service provider, said TAPI device being interfaced with a TAPI compliant driver program, said driver program being capable of receiving general telephone function commands from said programs in said telephone function library and converting them to commands and/or signals specific to said TAPI device and of sending said commands and/or signals to said TAPI device to cause it to carry out telephone functions;

a keyboard coupled to said computer for providing user inputs;

a pointing device coupled to said computer for providing user inputs; and a video display coupled to said computer, wherein said telephone application program controls operations of said computer and a modem via function calls to said TAPI and other application programmatic interfaces to display a virtual telephone on said video display with various displayed virtual keys which may be virtually pushed by a user using said keyboard or pointing device to cause various programs in said telephone function library to execute and cause said TAPI device to carry out the user selected telephone function and to cause said display of said virtual telephone on said video display to have a fixed length but a continuously variable, user-selectable width, wherein the user selectable width is selected by placing a pointer, moved by said pointing device, on a border of a window in which said virtual telephone is displayed and dragging said border either left or right to resize the window to a desired width, and wherein the number of virtual keys which are displayed and which are available to be pressed changes with a changing size of the window.

6. The apparatus of claim 5 wherein a first predetermined group of virtual keys are displayed in a smallest segment of the displayed virtual telephone and one or more virtual keys of a second predetermined group of virtual keys are displayed as the size of the displayed virtual telephone increases based at least in part on an approximate order of frequency of use of said virtual keys for an average user.

* * * * *